United States Patent
Piszkin et al.

(10) Patent No.: US 12,351,267 B2
(45) Date of Patent: Jul. 8, 2025

(54) BICYCLE STEM

(71) Applicant: JackRabbit Mobility Inc., La Jolla, CA (US)

(72) Inventors: Thomas M. Piszkin, Santee, CA (US); D'Arcy O'Connor, Victoria (CA); Jason B. Kenagy, La Jolla, CA (US); Jan K. Lezny, La Jolla, CA (US)

(73) Assignee: JackRabbit Mobility Inc., La Jolla, CA (US)

( * ) Notice: Subject to any disclaimer, the term of this patent is extended or adjusted under 35 U.S.C. 154(b) by 0 days.

(21) Appl. No.: 18/820,770

(22) Filed: Aug. 30, 2024

(65) Prior Publication Data

US 2025/0074538 A1 Mar. 6, 2025

Related U.S. Application Data

(60) Provisional application No. 63/580,505, filed on Sep. 5, 2023.

(51) Int. Cl.
*B62K 21/12* (2006.01)
*B62K 21/16* (2006.01)
*B62K 21/18* (2006.01)

(52) U.S. Cl.
CPC .............. *B62K 21/16* (2013.01); *B62K 21/18* (2013.01)

(58) Field of Classification Search
CPC ........ B62K 21/12; B62K 21/16; B62K 21/18; B62K 21/22; B62K 21/24
See application file for complete search history.

(56) References Cited

U.S. PATENT DOCUMENTS

| | | | | |
|---|---|---|---|---|
| 689,217 | A * | 12/1901 | Palmer | B62K 21/16 74/551.3 |
| 5,509,328 | A * | 4/1996 | Lai | B62K 21/16 280/279 |
| 5,562,013 | A * | 10/1996 | Kao | B62K 21/16 403/81 |
| 8,550,484 | B1 * | 10/2013 | Draper | B62K 21/16 280/278 |
| 2002/0121155 | A1 * | 9/2002 | Wu | B62K 3/002 74/551.3 |

(Continued)

FOREIGN PATENT DOCUMENTS

| | | | | |
|---|---|---|---|---|
| DE | 19837972 A1 * | 2/2000 | ............ | B62K 21/16 |
| DE | 202014004397 U1 * | 9/2014 | ............ | B62K 21/16 |

(Continued)

*Primary Examiner* — Adam D Rogers
(74) *Attorney, Agent, or Firm* — MLO, a professional corp.

(57) ABSTRACT

A stem includes a quill with a quill length extending along an axis. A first quill end has a cradle configured to couple to a handlebar, and a second quill end has helical slots opposite one another. A base has a base length extending along the axis. The base is configured to receive the quill. A first base end has a bracket configured to couple to a steering mast. The base has apertures opposite one another, and a second base end has a groove extending along the axis. A pin is coupled to the base perpendicular to the axis through the apertures. A releasable clamp is sized to fit around a base outer diameter. The helical slots are configured to receive the pin and slidably guide the pin along the helical slots of the quill such that the quill is rotatable within the base and relative to the base.

10 Claims, 8 Drawing Sheets

(56) References Cited

U.S. PATENT DOCUMENTS

| | | |
|---|---|---|
| 2006/0096408 A1 | 5/2006 | Liao |
| 2010/0132502 A1 | 6/2010 | Lacreu |
| 2012/0125145 A1 | 5/2012 | VanderVeen |
| 2017/0008597 A1 | 1/2017 | Sime |
| 2021/0001949 A1 | 1/2021 | Chan et al. |

FOREIGN PATENT DOCUMENTS

| | | | |
|---|---|---|---|
| DE | 202021000494 U1 | * | 3/2021 |
| GB | 191225984 A | * | 7/1913 |

* cited by examiner

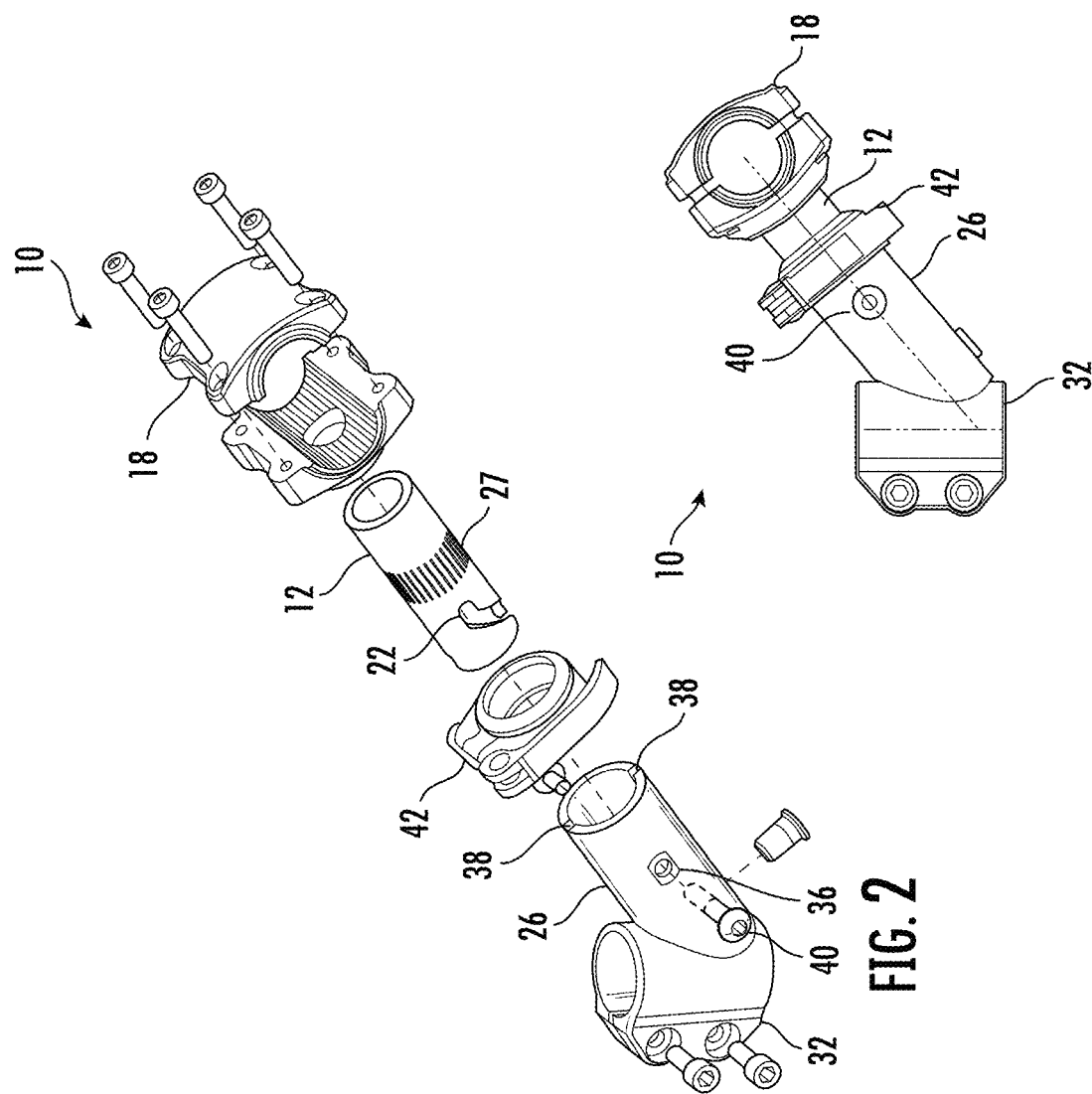

BICYCLE STEM

RELATED APPLICATIONS

This application claims priority to U.S. Provisional Patent Application No. 63/580,505 filed on Sep. 5, 2023, which is hereby incorporated by reference in full.

BACKGROUND

Bicycles have gained widespread popularity as a favored mode of transportation. Their appeal lies not only in their eco-friendly nature and health benefits but also in their versatility making them an ideal choice for navigating various environments. Bicycles are comprised of an array of components, and one such component, the stem, attaches the handlebars to the steering mast of the front fork. The stem facilitates a secure and confident means for the user to control the direction of the front wheel of the bicycle providing a stable and safe riding experience. Given a range of circumstances, cyclists may need to walk alongside their bikes which presents a challenge when attempting to traverse tight spaces. For example, the handlebars protrude or "stick out" and may catch on people or objects. The protruding handlebars make it difficult to pass through narrow confines such as in congested areas or crowded pathways. Further, the width of the handlebars is a hindrance for parking, transporting, stowing and storing the bicycle. For enhanced user experience and convenience, it is desirable to reduce the footprint of the bicycles.

SUMMARY

A stem is disclosed and includes a quill being tubular with a quill length extending along an axis. The quill has a first quill end opposite a second quill end. The first quill end has a cradle configured to couple to a handlebar, and the second quill end has helical slots opposite one another. A base is tubular with a base length extending along the axis. The base is configured to receive the quill and has a first base end opposite a second base end. The first base end has a bracket configured to couple to a steering mast. The base has apertures opposite one another, and the second base end has a groove extending along the axis. A pin is coupled to the base perpendicular to the axis through the apertures. A releasable clamp is sized to fit around a base outer diameter and configured to compress the base creating a clamping force. The helical slots are configured to receive the pin and slidably guide the pin along the helical slots of the quill such that the quill is rotatable within the base and relative to the base, from a walk mode, through a transition mode, to a ride mode.

BRIEF DESCRIPTION OF THE DRAWINGS

FIGS. 1 and 2 are exploded perspective side views of a stem, in accordance with some embodiments.

FIG. 3A is a side view of the stem, in accordance with some embodiments.

FIG. 3B is a perspective side view of the stem, in accordance with some embodiments.

DETAILED DESCRIPTION

Figure 1:
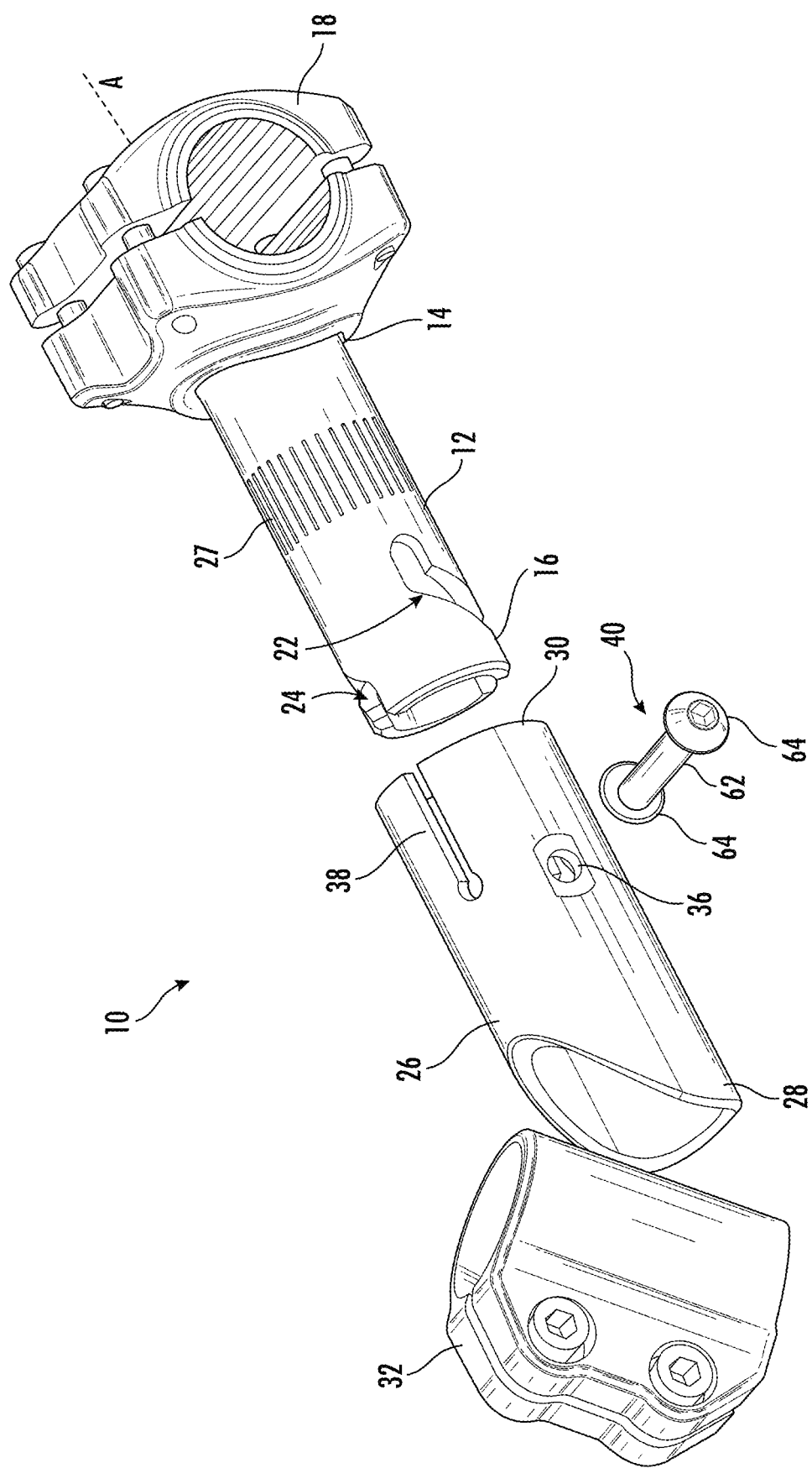

The present embodiments provide a bicycle stem that enables a ride mode and a walk mode for the bicycle. Ride mode generally refers to a mode in which the bicycle is configured for a user (also known as a rider) to ride the bicycle (i.e., where the user is positioned on the saddle and the bicycle is in motion). Walk mode generally refers to a mode in which the bicycle is configured for the user to walk next to the bicycle while rolling and controlling the bicycle. Walk mode may be implemented when there is a need to reduce the amount that the handlebars protrude from the frame such as when the bicycle is being maneuvered through congested areas, parked in crowded conditions, housed in a bike rack, transported, stowed, stored, or the like. In ride mode, the handlebars coupled to the stem are aligned perpendicular to the front wheel such as the typical configuration of a bicycle. In walk mode, the handlebars coupled to the stem are rotated to be parallel to the wheel.

In some embodiments, the stem includes a base with a pin that receives a quill, and the quill is rotatable in the base relative to the base. The quill includes helical slots with a first section, a second section and a spiral section, and the pin of the base is guided in the helical slots. In walk mode, the pin is in the first section of the helical slot and the quill and handlebars are rotated such that the handlebars are aligned parallel to the wheel. In walk mode, the handlebars are secure and immobilized due to the pin in the first section of the helical slot (and a clamp, as described herein) preventing the rotation of the quill relative to the base. In this configuration, the bicycle has a slim profile in a streamlined manner because the handlebars no longer protrude from the frame. The overall width of the bicycle is minimized allowing for greater maneuverability through tight spaces or congested areas. Because the handlebars are secure in walk mode, the rider may walk next to the bicycle and have full control of the steering and braking capabilities of the bicycle.

In embodiments of the present disclosure, the pin is moveable relative to the helical slot of the base and may move between the first section and the second section by sliding through the spiral section of the helical slot. For example, the helical slots can receive the pin and slidably guide the pin along the helical slots of the quill such that the quill is rotatable within the base and relative to the base, from a walk mode, through a transition mode, to a ride mode. The bicycle is in transition mode when the pin is in the spiral section of the helical slot, and the quill and handlebars are free to rotate between the walk mode and ride mode positions. In the transition mode, the quill is rotatable in the base relative to the base and thus, the handlebars freely rotate independently from the front wheel. As the pin enters the second section, it provides a position where the rotation of the quill can be effectively locked with respect to the base in ride mode, where the handlebars are perpendicular to the front wheel. The position of the pin and quill with respect to the base can be further secured with a releasable clamp engaged around or encircling the base of the stem in walk mode and/or ride mode. The stem may quickly, conveniently, and safely be switched from walk mode (handlebars parallel to the front wheel) through transition mode (handlebars rotating) to ride mode (handlebars perpendicular to the front wheel) or from ride mode (handlebars perpendicular to the front wheel) through transition mode (handlebars rotating) to walk mode (handlebars parallel to the front wheel) without tools and without removing the stem from the steering mast.

Advantageously, the stem is robust and durable and securely holds the handlebars in both walk mode and ride mode. The present embodiments describe an economical and efficient stem design comprising of minimal components, offering a low-cost solution that effectively mitigates the potential for component failure while reducing the footprint of the bicycle.

FIGS. 1 and 2 are exploded perspective side views of a stem, in accordance with some embodiments. A bicycle stem 10 is a bicycle component that connects the handlebars to a steering mast (also known as a headset) of the front fork and contributes to steering responsiveness and stability of the bicycle. In some embodiments, the stem 10 includes a quill 12. The quill 12 is tubular shaped and hollow having a circular cross-section with a quill outer diameter, and a quill length which extends along an axis A. The quill 12 has a first quill end 14 opposite a second quill end 16, and the first quill end 14 has a cradle 18 configured to couple to handlebars 20 (shown in FIG. 5C). The cradle 18 holds and secures the handlebars 20 in place and may allow for adjustments. The cradle 18 may be a bracket, clamp or the like, and is positioned at the middle portion or center of the handlebars 20. The first quill end 14 may be coupled to the cradle 18 by mechanical means such as fasteners, welding, or forging. In some embodiments, the cradle 18 may be integrated with the quill 12, forming a unified single component. The second quill end 16 has helical slots 22 and 24, and the helical slots 22 and 24 are opposite one another (e.g., helical slot 22 is opposite helical slot 24). The helical slots 22 and 24 are configured as passageways such as a slot, channel or groove. The helical slots 22 and 24 may be positioned at the endpoints of a diameter of the circular cross-section and may begin at the second quill end 16 and extend along the axis A around a circumference of the quill 12.

A base 26 is tubular shaped and hollow having a circular cross-section with a base inner diameter, a base outer diameter and a base length extending along the axis A. The base 26 is configured to receive the quill 12 so that the base inner diameter is greater than the quill outer diameter. The quill 12 is rotatable about the axis A when positioned in the base 26 and may rotate relative to base 26. In some embodiments, the quill 12 has a textured pattern, abrasions or knurling 27 on an outer surface to increase the friction between it and the base 26. The base 26 has a first base end 28 opposite a second base end 30. The first base end 28 of the base 26 is coupled to a bracket 32. The coupling may be by mechanical means such as fasteners, welding, or forging. In some embodiments, the base 26 may be integrated with the bracket 32, forming a unified single component. The bracket 32 is configured to couple to a steering mast 34 (shown in FIGS. 5A-5C and 6B). In this way, the stem 10 is located between the handlebars 20 and the steering mast 34 as shown in FIG. 5C. The base 26 has apertures 36 opposite one another, and the apertures 36 extend through the base outer diameter and the base inner diameter. The second base end 30 has a groove 38 extending along the axis A. The groove 38 may function as a compression slot, as described herein. The groove 38 may extend through the base outer diameter and the base inner diameter. In some embodiments, there may be more than groove 38 such as a second groove opposite the first groove 38.

In some embodiments, the quill 12 and the base 26 are comprised of metal, composite material or a combination thereof. For example, in some embodiments, the base 26 may be comprised of aluminum and the quill 12 may be comprised of carbon fiber.

Referring to FIG. 1, a pin 40 is comprised of a rod 62 and endcaps 64 at each end of the rod 62. The pin 40 is coupled to the base 26 perpendicular to the axis A through the apertures 36. In some embodiments, the apertures 36 may be configured so the endcaps 64 of the pin 40 are flush with the surface of the base outer diameter. In some embodiments, an inner endcap surface contacts the surface of the base outer diameter or a surface between the base inner diameter and the base outer diameter.

FIG. 3A is a side view of the stem, and FIG. 3B is a perspective side view of the stem, both in accordance with some embodiments. A releasable clamp 42 is sized to fit around the base outer diameter and configured to compress the base 26 creating a clamping force. The grooves 38 enable the base outer diameter to decrease in diameter when the clamp 42 is engaged thereby creating the clamping force on the quill 12 and preventing rotation of the base 26 and/or the quill 12. The clamp 42 is configured to prevent the rotation of the quill 12 relative to the base 26 in the walk mode and in the ride mode. The releasable clamp 42 may be a reusable quick-release style fastener such as with a lever design (as shown in FIG. 2), a turn screw design (as shown in FIG. 5C), or the like. The user may utilize the clamping mechanism to apply a higher clamping pressure and securing effect when in ride mode than when in walk/flat mode for reasons of convenience and need.

Figure 4A:
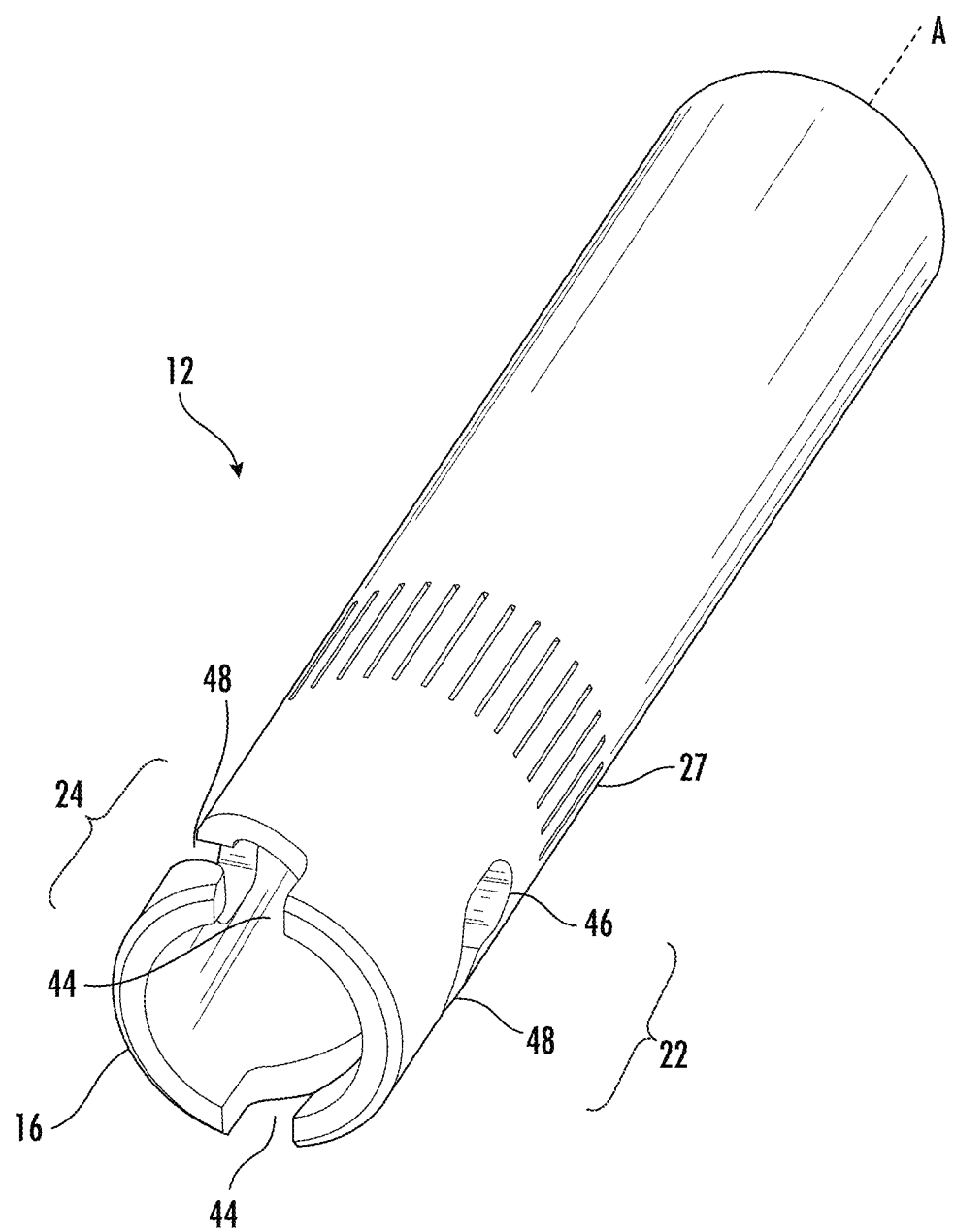
FIGS. 4A-4D are various views of the quill, all in accordance with some embodiments.
Figure 4C:
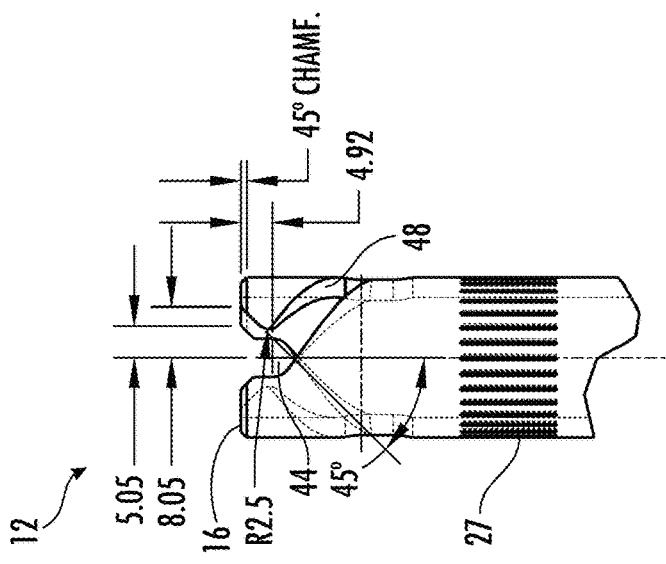
Figure 4D:
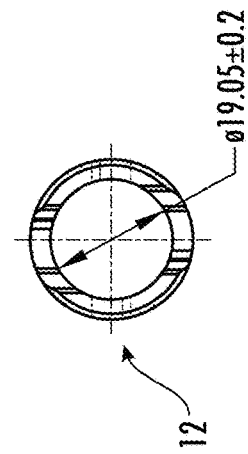
Figure 4B:
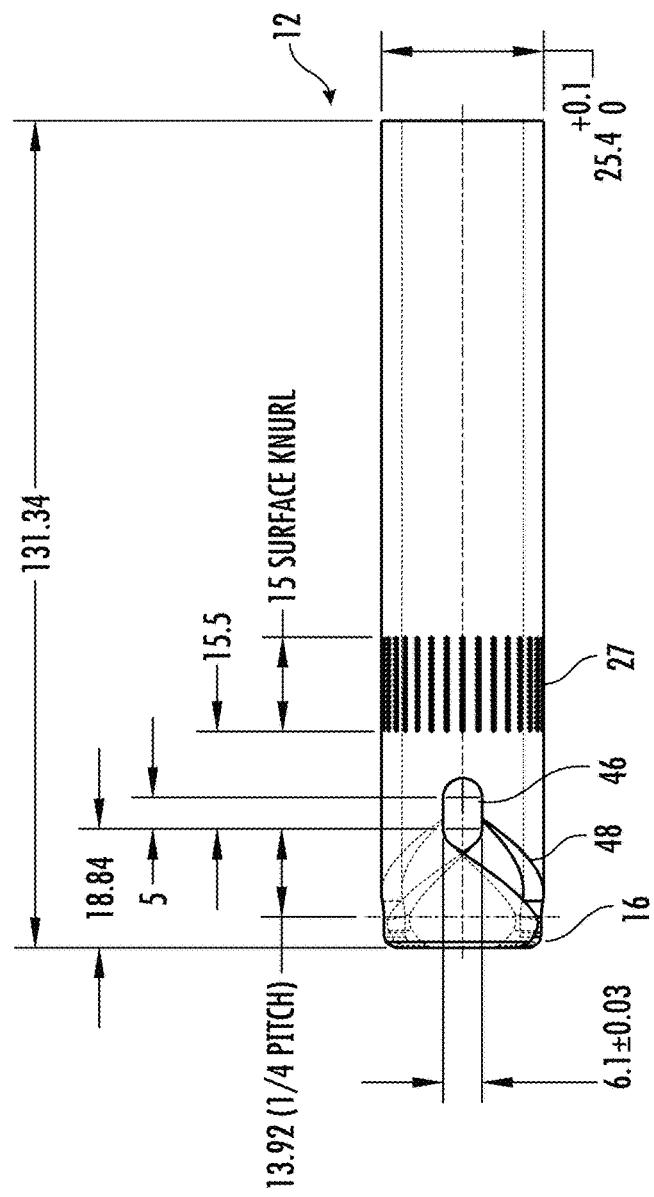

FIGS. 4A-4D are various views of the quill, all in accordance with some embodiments. For example, FIG. 4A is a perspective view of the quill, FIG. 4B is a front view of the quill, FIG. 4C is a top view of the quill, and FIG. 4D is a side view of the quill. FIGS. 4B-4D include some example dimensions. In some embodiments, the dimensions, such as the diameter of the rod, angle of the helical slot, etc., can be different than those shown in FIGS. 4B-4D. Each helical slot 22 and 24 includes a first section 44, a second section 46, and a spiral section 48. The first section 44 begins at an edge of the second quill end 16 and extends along the axis A. In some embodiments, a distance along the axis A of the first section 44 is at least a diameter of the rod 62 of the pin 40. In walk mode, the rod 62 of the pin 40 of the base 26 will be secured in the first section 44 of the quill 12. The second section 46 is separate from the first section 44 and extends along the axis A. In some embodiments, a distance along the axis A of the second section 46 is at least a diameter of the rod 62 of the pin 40. The second section 46 corresponds to the position of the quill 12 in the ride mode. The spiral section 48 may be shaped along the circumference of the quill 12 such as a curve, spiral or helix. For example, the spiral of the spiral section 48 may turn or "corkscrew" around the axis A at a constant number of turns or a variable number of turns along the length of the axis A. The spiral section 48 is between the first section 44 and the second section 46 beginning at the first section 44 and extend along the axis A around the circumference of the quill 12 and ending at the second section 46. In some embodiments, the angle of the helical slot at the midpoint between sections 44 and 46 is of 43° to 46° or an angle of 45°. In transition mode, the rod 62 of the pin 40 of the base 26 slides in the spiral section 48 enabling the quill 12 and handlebars to rotate with respect to the base 26.

The distal ends of the first section 44 and the second section 46 are the ends not connected to the spiral section 48. These distal ends may be shaped to help retain the pin 40 and be rounded, pointed, truncated, tapered or the like. The surface of the quill 12 at the first section 44 and the second section 46 may also have features to further help retain the pin 40 such as an inward taper (e.g., toward the centerline of the quill 12) or indentation. In other words, diameters at the first section 44 and the second section 46 may be less than the quill outer diameter of the other portion of the quill 12.

Figure 5A:
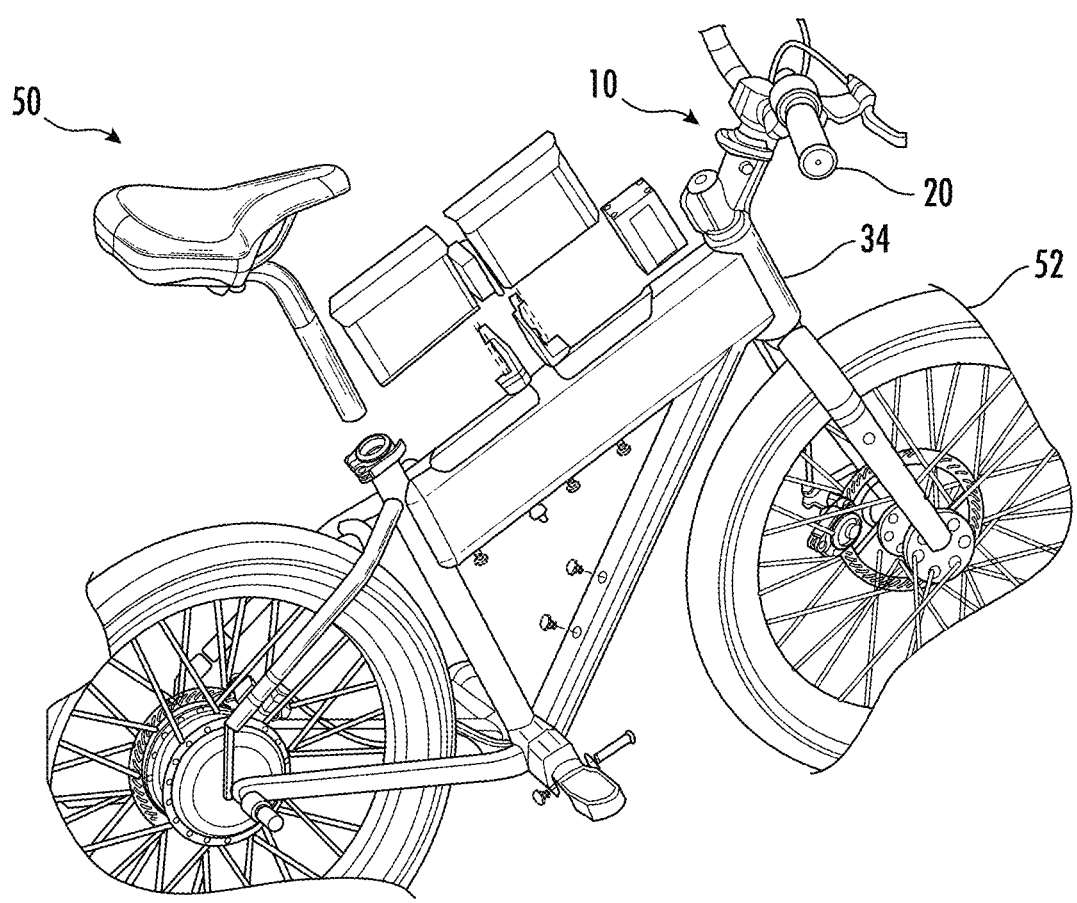
FIGS. 5A and 5B are perspective views of the stem mounted on an example bicycle in ride mode, both in accordance with some embodiments.
Figure 5B:
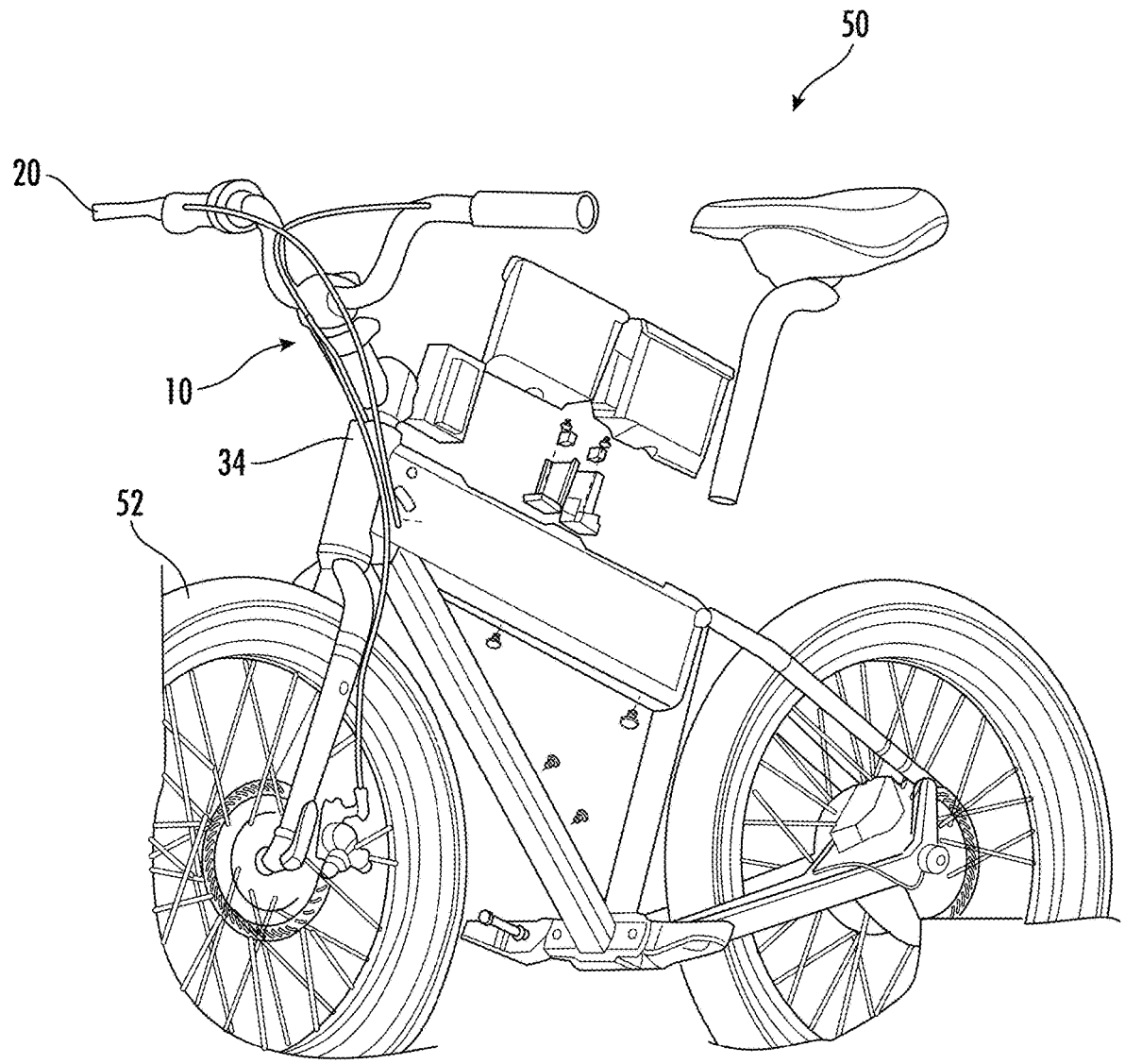
Figure 5C:
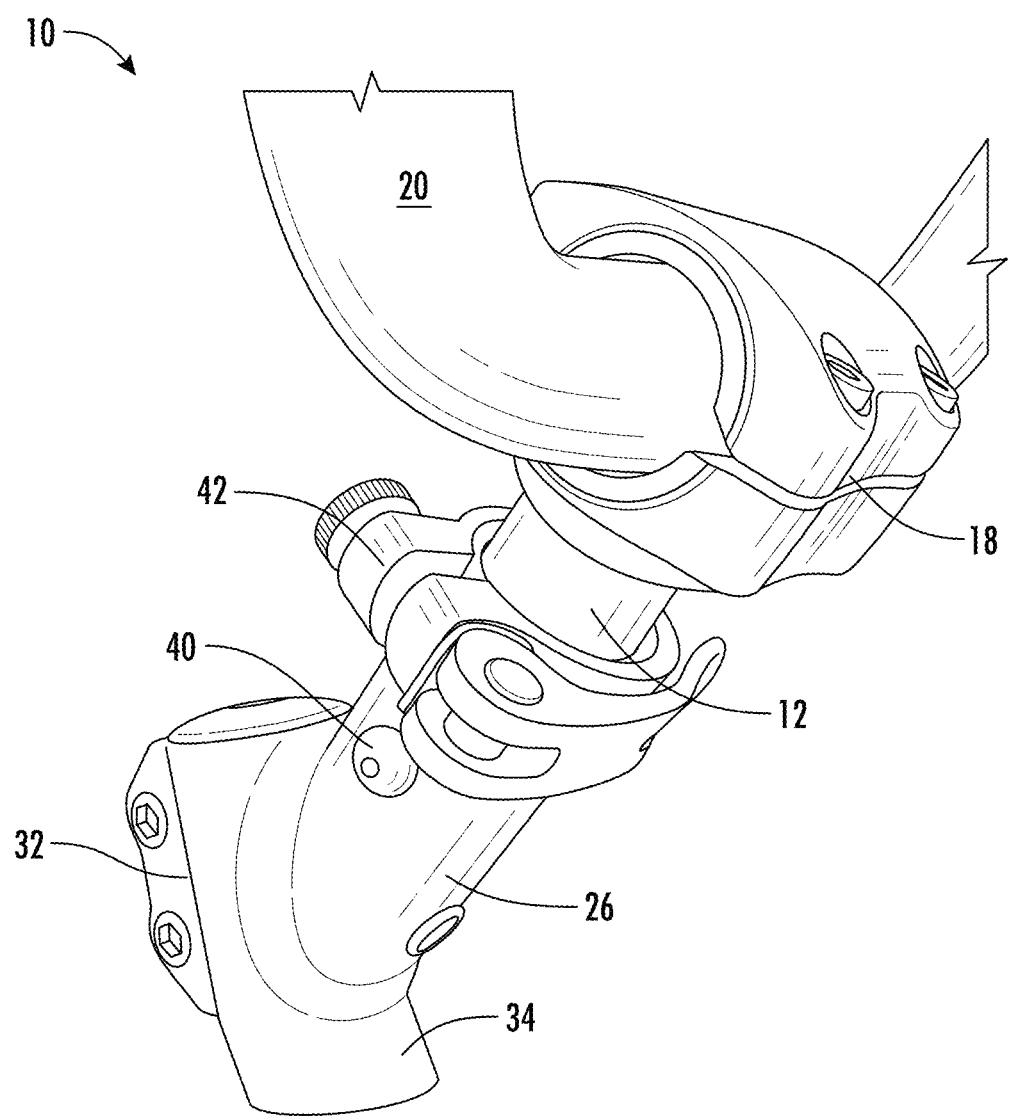
FIG. 5C is a close-up view of the stem mounted on an example bicycle in ride mode, in accordance with some embodiments.

FIGS. 5A and 5B are perspective views of the stem mounted on an example bicycle in ride mode, and FIG. 5C is a close-up view of the stem mounted on an example bicycle in ride mode, all in accordance with some embodiments. As shown in FIGS. 5A and 5B, the stem 10 is mounted on an example bicycle 50 and is coupled to the handlebars 20 and the steering mast 34 of the front fork. The pin 40 is positioned in the second section of the helical slot 22 and 24 enabling the handlebars to be perpendicular to the bicycle frame and the front wheel 52. This is the typical configuration the user would use for ride mode such as when riding the bicycle.

Figure 6A:
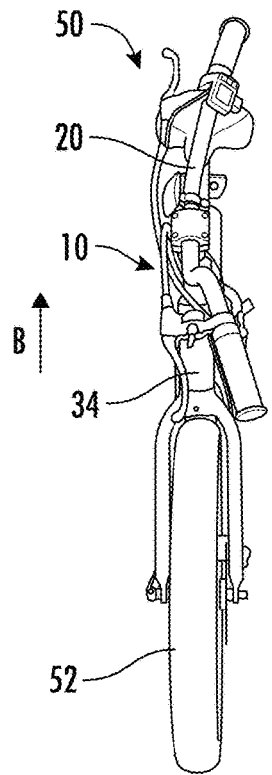
FIG. 6A is a front view of the stem mounted on an example bicycle in walk mode, in accordance with some embodiments.
Figure 6B:
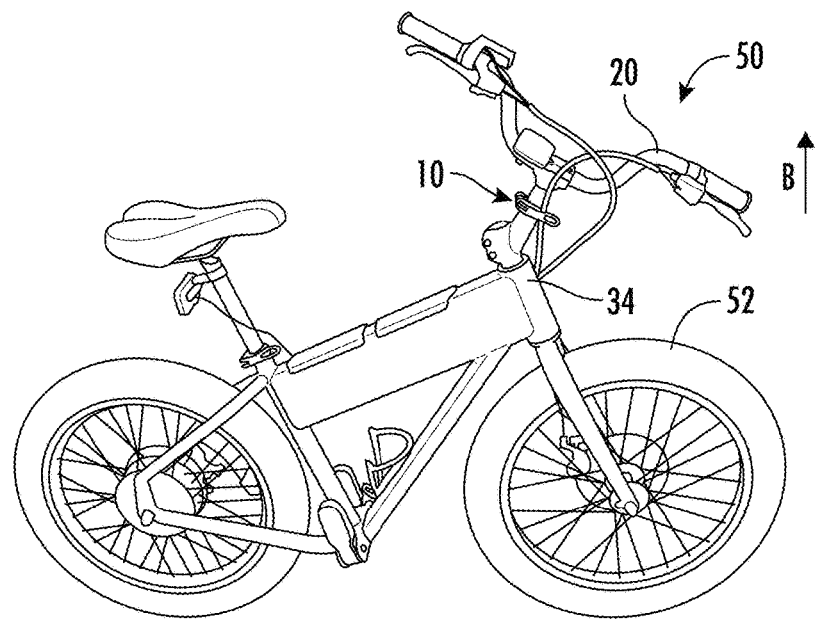
FIG. 6B is a side view of the stem mounted on an example bicycle in walk mode, in accordance with some embodiments.
Figure 6C:
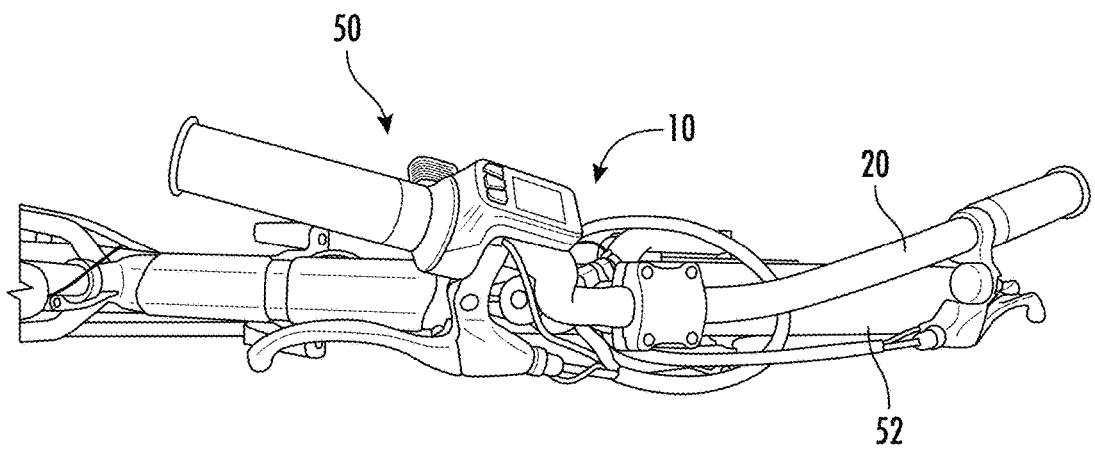
FIG. 6C is a top view of the stem mounted on an example bicycle in walk mode, in accordance with some embodiments.

FIG. 6A is a front view of the stem mounted on an example bicycle in walk mode, FIG. 6B is a side view of the stem mounted on an example bicycle in walk mode, and FIG. 6C is a top view of the stem mounted on an example bicycle in walk mode, all in accordance with some embodiments. When the ride mode is implemented as shown in FIGS. 5A and 5B, the user can conveniently and easily switch to walk mode. To do so, the user may be positioned on the saddle of the bicycle such as when riding the bicycle, or may be dismounted from the bicycle. The clamp 42 is released, loosened, or opened from the stem 10 which is accomplished without tools and in some embodiments, with one hand of the user. Because the clamp 42 only enhances the locked position, the quill 12 does not rotate relative to the base 26 once the clamp 42 is released. As such, it is possible and safe to change from ride mode to walk mode while the bicycle is in motion. For example, the user may be riding the bicycle, brake and dismount and transition to walk mode while the bicycle is rolling or without fully stopping the bicycle.

In ride mode, the pin 40 is in the second section 46 of the helical slots 22 and 24. A small, slight force may be applied to the handlebars 20 in an upward direction B such as in the opposite direction of the ground, to switch to transition mode. Accordingly, the pin 40 is guided into the spiral section 48 of the helical slots 22 and 24 and the quill 12 rotates relative to the base 26, e.g., the handlebars 20 freely rotate independently of the front wheel 52. In transition mode, the design of the pin 40 relative to the helical slots 22 and 24 is guided in a smooth and fluid manner through the spiral or helix so when the bicycle is in motion, such as if the user is riding the bicycle or dismounted from the bicycle and pushing the bicycle, the motion of the bicycle is uninterrupted. Advantageously, the user has complete control of the maneuverability, steering and braking control of the bicycle during ride mode and walk mode. For example, in walk mode, when the handlebars are parallel with the front wheel and in the locked in position, the user may be walking next to the bicycle while the bicycle is rolling. In this configuration, the user may steer the bicycle by holding the grip of the handlebars and guide or lean the bicycle to turn. The user may also apply the brakes (e.g., hand-operated brakes) to stop the bicycle if necessary.

The pin 40 follows the helical slots 22 and 24 as the handlebars 20 are rotated, and the pin 40 enters the first section 44 of the helical slots 22 and 24. When the pin 40 is in the first section 44 of the helical slot 22 and 24, the bicycle is in walk mode. As such, the handlebars 20 are now positioned parallel to the length of the bicycle or coplanar with the wheel 52, as shown in FIGS. 6A-6C. The handlebars 20 are locked in position, meaning the quill 12 does not rotate relative to the base 26. Optionally, the clamp 42 may be installed around the base 26 to further secure the locked position.

The pin 40 and helical slot 22 and 24 design of the stem enables the quill 12 to rotate relative the base 26. In some embodiments, the quill 12 rotates 90° around the axis A. For example, in ride mode, the cradle 18 and handlebars 20 are in a position perpendicular to the axis A. In this configuration, the handlebars 20 protrude from the frame of the bicycle and the overall width of the bicycle is at a maximum distance. In walk mode, the cradle 18/handlebars 20 are rotated 90° to the axis A so the handlebars 20 do not protrude from the frame but rather, are in line with wheel 52 creating a slim, compact profile. In this configuration, it was convenient for the user to walk next to the bicycle and push the bicycle such as through congested areas. The grip of a handlebar refers to the part of the handlebar that the user holds onto while operating the bicycle. In walk mode, it is the natural position for the user to hold the grip for controlling the bicycle and maintaining balance.

The quill 12 and base 26 of the stem 10 are coaxial in the ride mode, transition mode and walk mode. This design choice combined with the pin guided through the helical slots, allows the cradle/handlebars to be in line or in the same plane with the frame and the wheel in walk mode as opposed to "next to" the frame, (e.g., parallel but not in the same plane). This reduces the footprint of the bicycle enabling the bicycle to have a narrow profile while the user retains full functionality of the steering and braking systems of the bicycle.

As described, changing between ride mode, transition mode and walk mode may be accomplished by releasing the clamp 42 then applying a slight force to the handlebars 20 in the upward direction B. Moving between walk mode, transition mode and ride mode may be accomplished by releasing the clamp 42 then applying a slight force to the handlebars 20 in a downward direction (e.g., toward the ground). In some embodiments, the handlebars 20 can be conveniently and easily removed from the bicycle from walk mode. For example, in walk mode, a force may be applied to the handlebars 20 in the upward direction (e.g., opposite the ground) then the quill 12 may be maneuvered out of the base 26 before the pin 40 can enter the spiral section 48 of the helical slots 22 and 24.

Reference has been made in detail to embodiments of the disclosed invention, one or more examples of which have been illustrated in the accompanying figures. Each example has been provided by way of explanation of the present technology, not as a limitation of the present technology. In fact, while the specification has been described in detail with respect to specific embodiments of the invention, it will be appreciated that those skilled in the art, upon attaining an understanding of the foregoing, may readily conceive of alterations to, variations of, and equivalents to these embodiments. For instance, features illustrated or described as part of one embodiment may be used with another embodiment to yield a still further embodiment. Thus, it is intended that the present subject matter covers all such modifications and variations within the scope of the appended claims and their equivalents. These and other modifications and variations to the present invention may be practiced by those of ordinary skill in the art, without departing from the scope of the present invention, which is more particularly set forth in the appended claims. Furthermore, those of ordinary skill in the art will appreciate that the foregoing description is by way of example only, and is not intended to limit the invention.

What is claimed is:

1. A bicycle stem comprising:
    a quill being tubular shaped with a quill length extending along an axis, the quill having a first quill end opposite a second quill end, the first quill end having a cradle configured to couple to handlebars, the second quill end having helical slots opposite one another;
    a base being tubular shaped with a base length extending along the axis, the base configured to receive the quill, and having a first base end opposite a second base end, the first base end having a bracket configured to couple to a steering mast, the base having apertures opposite one another and the second base end having a groove extending along the axis;
    a pin coupled to the base perpendicular to the axis through the apertures; and
    a releasable clamp sized to fit around a base outer diameter and configured to compress the base creating a clamping force;
    wherein the helical slots are configured to receive the pin and slidably guide the pin along the helical slots of the quill such that the quill is rotatable within the base and relative to the base, from a walk mode, through a transition mode, to a ride mode.

2. The bicycle stem of claim 1 wherein each helical slot comprises:
    a first section beginning at an edge of the second quill end and extending along the axis, and corresponding to a position of the quill in the walk mode; and
    a second section separate from the first section and extending along the axis, and corresponding to the position of the quill in the ride mode; and
    a spiral section between the first section and the second section and corresponding to the position of the quill in the transition mode.

3. The bicycle stem of claim 2 wherein a distance along the axis of the first section is at least a diameter of the pin.

4. The bicycle stem of claim 2 wherein a distance along the axis of the second section is at least a diameter of the pin.

5. The bicycle stem of claim 1 wherein each helical slot has a first section beginning at an edge of the second quill end and extends along the axis, a spiral section beginning at the first section and extending along a circumference of the quill, and a second section beginning at an end of the spiral section and extending along the axis.

6. The bicycle stem of claim 1 wherein when in the walk mode, the pin is in a first section of the helical slots.

7. The bicycle stem of claim 6 wherein when in the ride mode, the pin is in a second section of the helical slots.

8. The bicycle stem of claim 1 wherein a base inner diameter is greater than a quill outer diameter.

9. The bicycle stem of claim 1 wherein the releasable clamp is configured to prevent rotation of the quill relative to the base in the walk mode and in the ride mode.

10. The bicycle stem of claim 1 wherein in the walk mode, the handlebars are parallel with a front wheel of a bicycle comprising the bicycle stem.

* * * * *